United States Patent
Sip et al.

(10) Patent No.: US 8,076,902 B2
(45) Date of Patent: Dec. 13, 2011

(54) CHARGER

(75) Inventors: Kim-Yeung Sip, Shenzhen (CN);
Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 427 days.

(21) Appl. No.: 12/487,613

(22) Filed: Jun. 18, 2009

(65) Prior Publication Data

US 2010/0301805 A1    Dec. 2, 2010

(30) Foreign Application Priority Data

May 27, 2009   (CN) .......................... 2009 1 0302675

(51) Int. Cl.
*H02J 7/00*   (2006.01)

(52) U.S. Cl. ........ 320/114; 320/107; 320/111; 320/112; 362/183

(58) Field of Classification Search .................. 320/114, 320/107, 111, 112; 362/183
See application file for complete search history.

(56) References Cited

U.S. PATENT DOCUMENTS

| | | | | | |
|---|---|---|---|---|---|
| 5,982,140 | A | * | 11/1999 | Toya et al. | 320/110 |
| 6,044,281 | A | * | 3/2000 | Shirai | 455/573 |
| 6,066,938 | A | * | 5/2000 | Hyodo et al. | 320/114 |
| 6,819,082 | B2 | * | 11/2004 | Yang | 320/112 |
| 2003/0146735 | A1 | * | 8/2003 | Barbeau et al. | 320/114 |

* cited by examiner

*Primary Examiner* — Patrick Assouad
*Assistant Examiner* — Steve T Chung
(74) *Attorney, Agent, or Firm* — Altis Law Group, Inc.

(57) ABSTRACT

A charger capable of clamping portable communication device is provided. The charger includes a body, a securing portion, and at least one elastic element, wherein the at least one elastic element is deformable elastically when electricity power is supplied thereto, and recoverable to its normal shape when the power is off. The at least one elastic element joins the securing portion to the body. When a user uses the charger, firstly, places the portable communication device between the body and the securing portion, then, supplies electricity power, and the at least one elastic element contracts and drives the securing portion to move towards the body, as a result, the portable communication device is clamped.

7 Claims, 3 Drawing Sheets

CHARGER

BACKGROUND

1. Technical Field

The disclosure relates to a charger capable of charging a portable communication device.

2. Description of Related Art

Portable communication devices, such as mobile phones, become almost indispensable in daily life, accordingly, more and more people pay attention to chargers which can charge the mobile phone efficiently. Currently, to charge a mobile phone, a user has to insert a terminal of the connecting wire of a traditional charger into a jack of the mobile phone. However, such a connection is not always reliable and it is common for users to accidentally disconnect the charger from their phone without noticing it. Therefore, what is needed is a charger with a more reliable connection means to charge a portable communication device to solve the above-mentioned problem.

BRIEF DESCRIPTION OF THE DRAWINGS

The components of the drawings are not necessarily drawn to scale, the emphasis instead being placed upon clearly illustrating the principles of the charger. Moreover, in the drawings, like reference numerals designate corresponding parts throughout several views.

DETAILED DESCRIPTION

Figure 1:
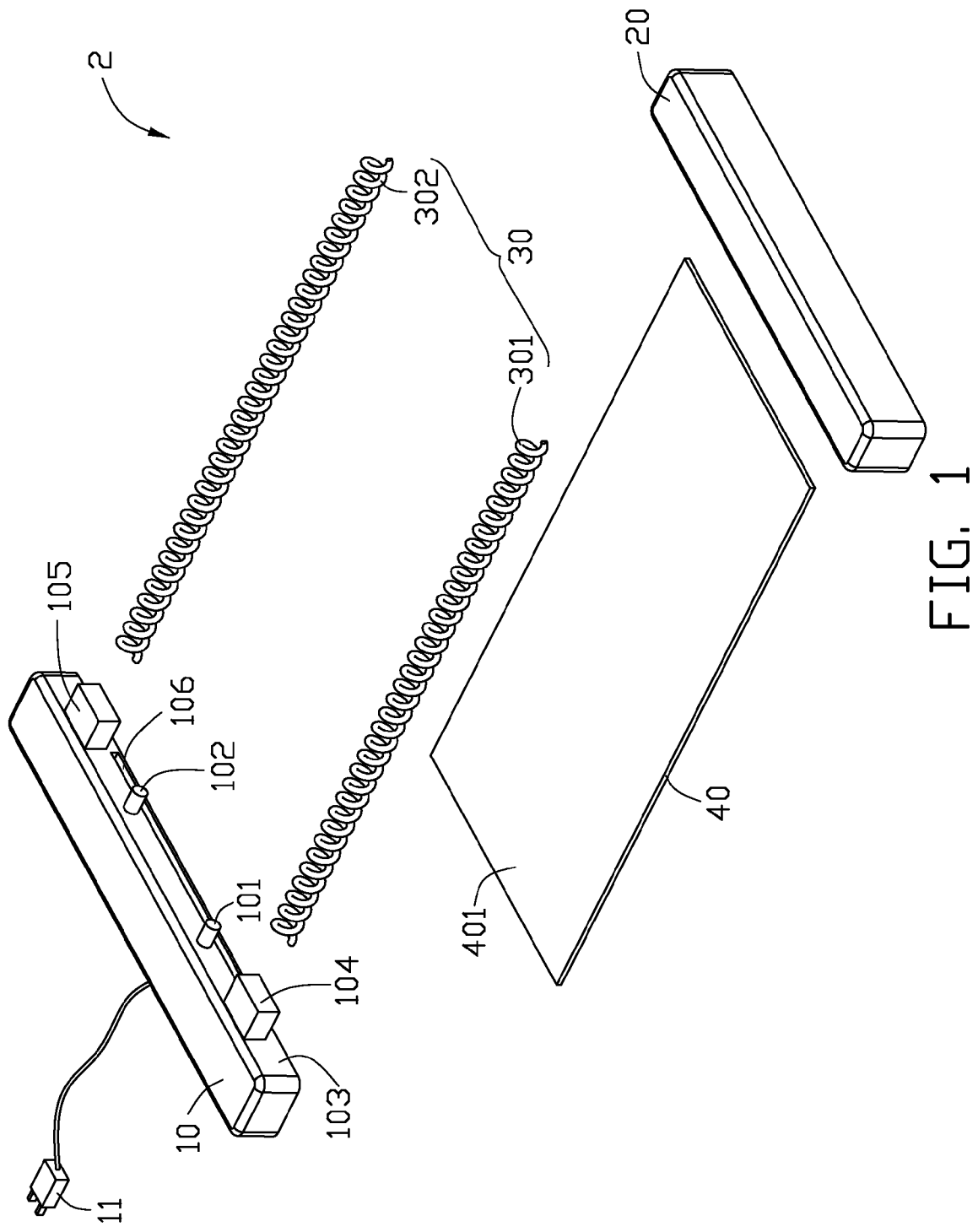
FIG. 1 is an exploded, perspective view of a charger in accordance with an exemplary embodiment.

FIG. 1 is an exploded perspective view of a charger 2 in accordance with an exemplary embodiment. The charger 2 includes a body 10, a securing portion 20, and at least one elastic element 30. Opposite ends of the elastic element 30 are fastened to the body 10 and the securing portion 20 correspondingly.

The body 10 includes two terminals 101 and 102, a circuit board (not shown) built into the body 10, and a power wire 11. The terminals 101 and 102 distributed at a sidewall 103 of the body 10 are electrically connected to the circuit board. The circuit board obtains electrical power from a power source (not shown) such as a wall outlet via a power wire 11. The circuit board converts and distributes the electrical power to charge a portable communication device 1 (shown in FIG. 2) via the terminals 101 and 102. Furthermore, it must be noted that the number of the electrodes is not limited to two, the number of the terminals matches the number of charging jacks of the portable communication device, in the exemplary embodiment, the portable communication device 1 includes two charging jacks 11 and 12 distributed at the bottom end of the portable communication device 1.

Figure 2:
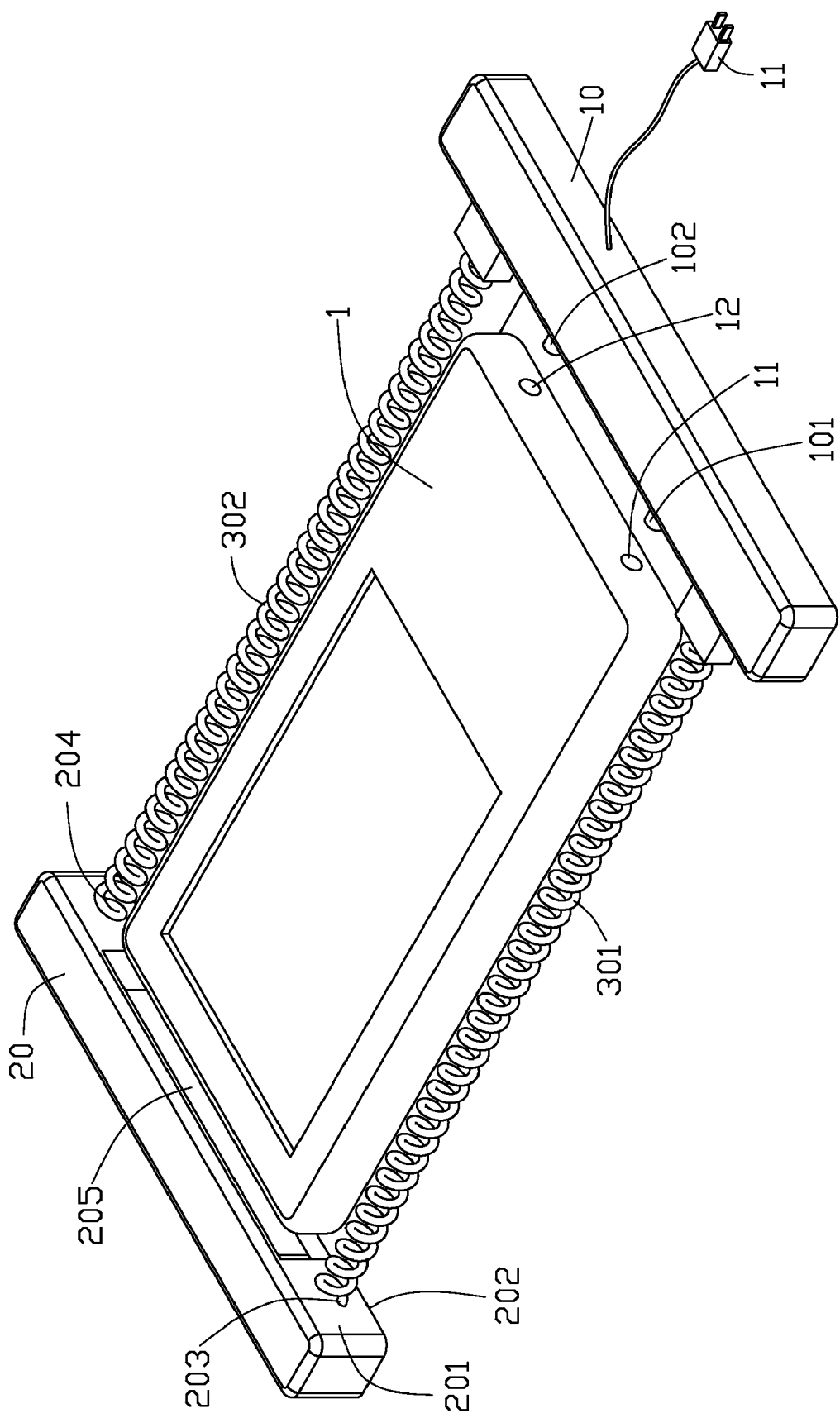
FIG. 2 is a perspective view of placing a portable communication device in the charger of FIG. 1.

Referring also to FIG. 2, the securing portion 20, which is a rectangular parallelepiped, includes a sidewall 201 and a bottom 202. A receiving groove 205 is defined on the sidewall 201, for receiving the top end of the portable communication device 1 during charging.

The elastic element 30 is elastically deformable while electrical power is supplied to the elastic element 30, and is recoverable to its normal shape while the electricity power is removed. In the exemplary embodiment, the elastic element 30 is two springs 301 and 302.

In assembly, one end of the spring 301 is secured to a protrusion 104 protruded from the sidewall 103, and the other end of the spring 301 is secured to a contact point 203 of the securing portion 20, and one end of the spring 302 is connected to a protrusion 105, and the other end of the spring 302 is connected to a contact point 204 of the securing portion 20. Therefore, the protrusion 104, the spring 301, the contact points 203, 204, the spring 302, and the protrusion 105 form a circuit loop. The circuit board also supplies electrical power to the circuit loop.

The charger 2 further includes a support board 40 for supporting the portable communication device 1 during charging. One end of the support board 40 is secured to the bottom 202 of the securing portion 20, and the other end 401 of the support board 40 is accommodated in a limiting groove 106 of the body 10. The limiting groove 106 located below the electrodes 101 and 102 is opposite to the receiving groove 205. The limiting groove 106 has a depth that allows the end 401 of the board 40 to slide along within the limiting groove 106, therefore, the support board 40 is able to slide relative to the body 10.

Figure 3:
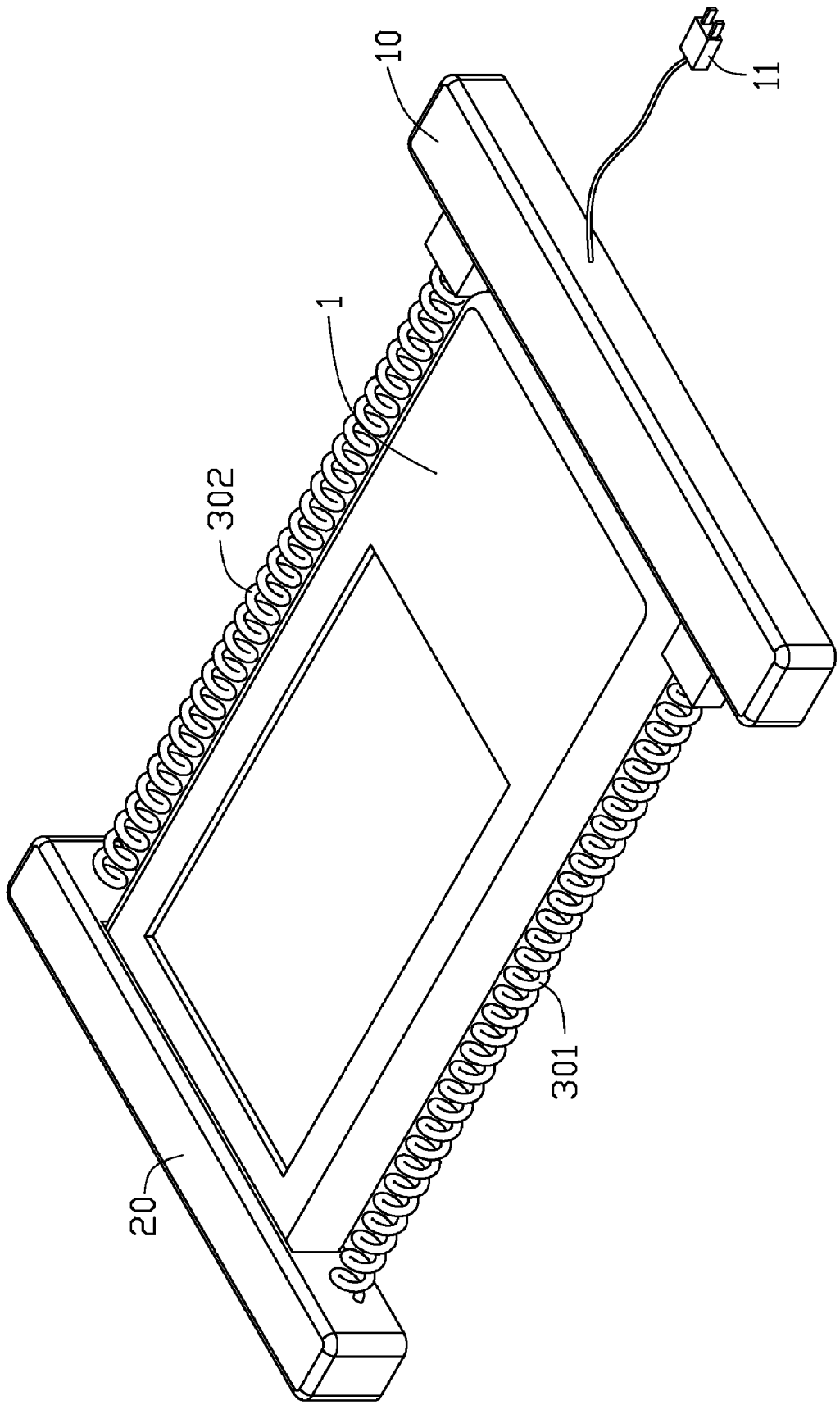
FIG. 3 is a perspective view illustrating a state of fixing the portable communication device in the charger of FIG. 1.

Referring to FIG. 3, when employing the charger 2 to charge the portable communication device 1, firstly, the portable communication device 1 is placed on the support board 40 and laid between the springs 301 and 302. The jacks 11, 12 of the portable communication device 1 are aligned with the terminals 101 and 102. Secondly, the charger is connected to the power source via the power wire 11, which allows the circuit board to obtain electrical power from the power source and supply the power to the circuit loop. The springs 301 and 302 contract and deform elastically, as a result, the securing portion 20 moves toward the body 10, causing the terminals 101 and 102 to be inserted into the jacks 11 and 21. The portable communication device 1 is therefore clamped in place in the charger 2. After charging is completed, and the power wire 11 is drawn out from the power source, the springs 301 and 302 rebound and recover to their normal length, which allows the user to easily take the portable communication device 1 out of the charger 2.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A charger, comprising:
   a body, wherein the body comprises at least one terminal for supplying electrical power to a portable communication device;
   a securing portion opposite to the body; and
   at least one elastic element located between the securing portion and the body and secured to both the securing portion and the body, the elastic element being deformable elastically when electricity power is supplied thereto, and recoverable to its normal shape when the power is off,
   wherein, the body, the securing portion and the at least one elastic element enclose the portable communication device and the at least one elastic element contracts when electrical power is supplied thereto, causing the securing portion to move towards the body and clamp the portable communication device with the body for charging.

2. The charger as described in claim 1, wherein the securing portion defines a receiving groove for holding the portable communication device during charging.

3. The charger as described in claim 1, wherein the at least one elastic element is a spring.

4. The charger as described in claim 1, further comprising a support board for supporting the portable communication device during charging, wherein the support board has one end secured to the securing portion and another end moveably accommodated in the body.

5. The charger as described in claim 4, wherein: the body has a limiting groove defined thereon, for receiving the end of the support board in the body; and the limiting groove has a depth allowing the support board to slide along the depth of the limiting groove.

6. The charger as described in claim 1, wherein: the at least one elastic element comprises two springs, one end of each spring is connected to the body and the other end is connected to the securing portion; and the two springs, the body and the securing portion form a circuit loop.

7. The charger as described in claim 6, wherein the two springs, the body and the securing portion enclose the portable communication device during charging.

* * * * *